United States Patent [19]

Ishiguro et al.

[11] Patent Number: 4,769,667
[45] Date of Patent: Sep. 6, 1988

[54] SHUTTER CONTROL APPARATUS FOR A CAMERA

[75] Inventors: Minoru Ishiguro; Seiji Asano, both of Saitama, Japan

[73] Assignee: Fuji Photo Film Co., Ltd., Kanagawa, Japan

[21] Appl. No.: 70,115

[22] Filed: Jul. 6, 1987

[30] Foreign Application Priority Data

Jul. 4, 1986 [JP] Japan .............................. 61-158586
Jul. 14, 1986 [JP] Japan .............................. 61-163883
Jul. 24, 1986 [JP] Japan .............................. 61-113860
Aug. 20, 1986 [JP] Japan .............................. 61-194781

[51] Int. Cl.⁴ .............................................. G03B 7/08
[52] U.S. Cl. .................... 354/435; 354/437; 354/439; 354/440
[58] Field of Search ............... 354/435, 436, 437, 439, 354/440

[56] References Cited

U.S. PATENT DOCUMENTS 4,325,614  4/1982  Grimes ............................. 354/437
4,354,748 10/1982  Grimes et al. .................... 354/437
4,572,645  2/1986  Yoshida et al. ................... 354/435

Primary Examiner—Russell E. Adams
Attorney, Agent, or Firm—Young & Thompson

[57] ABSTRACT

A camera shutter control apparatus comprises a detector for detecting the actual amount of opening of a camera shutter, comprised by a light emitter, a light detector, and a light controller for varying the amount of light passing therethrough from the light emitter to the light detector according to the detected amount of opening of the shutter. A controller controls the light emitter to emit a predetermined constant amount of light based on an output from the light detector. An operating device actuates the shutter in such a way to make the output of the light detector coincide with a signal representative of a predetermined shutter opening characteristic. The shutter is controlled to open and close following the predetermined characteristic defined by a shutter opening-closing program which is changeable according to the focal length of the camera lens.

20 Claims, 7 Drawing Sheets

SHUTTER CONTROL APPARATUS FOR A CAMERA

BACKGROUND OF THE INVENTION

The present invention relates to a shutter control apparatus for a camera.

There is well known in the art a camera shutter control apparatus by which a shutter is controlled to open and close following a predetermined shutter opening characteristic defined by a shutter opening-closing diagram by emitting a signal representative of an actual amount of opening of the shutter to coincide with a signal representative of the predetermined amount of opening. In such a camera shutter control, the actual amount of opening of the shutter is detected by diaphragm means which has a variable aperture and operates to increase the amount of light passing therethrough as the shutter opens and to shut off when the shutter fully closes. For the light detection, light emitting and light receiving elements are disposed on both sides of the diapraghm means.

In the above-described shutter control apparatus wherein the diaphram means shuts off light to the light receiving element when the shutter closes, there is a problem that it is impossible to known prior to the shutter opening whether the light emitting element emits a predetermined correct amount of light or not. Moreover, the amount of light emitted from the light emitting element generally changes depending on operating conditions, for example the changes of driving power. If in fact there occur changes of the amount of light emitted from the light emitting element, it is quite difficult to reflect correctly the amount of light detected by the light receiving element in the shutter control.

Another problem of such shutter control apparatus lies in applications to cameras of the type having an external light receiving element for detecting the scene brightness. Since exposure control is effected independently from shutter control, no information as to the amount of opening of the shutter is available for effecting exposure control. Therefore, the exposure control is effected taking an expected amount of opening of the shutter into consideration. Accordingly, due to unsteady operation of the shutters which results from various factors, such as manufacturing tolerances of the shutter, it becomes quite difficult to effect accurate exposure controls.

Still another problem is unstable shutter operation resulting from different camera positions. Specifically, shutter blades will be acted on by gravity differently in, for example, a horizontal camera position and an upright camera position. In order to operate the shutter accurately following the predetermined shutter opening characteristic, the conventional shutter mechanisms are generally provided with balancing members in such a way as to apply the same force on the shutter blades regardless of the camera position. The provision of such a balancer makes the shutter mechanism large in size and expensive.

OBJECT OF THE INVENTION

It is, therefore, an object of the present invention to provide a shutter control apparatus by which the shutter can be operated accurately.

It is another object of the present invention to provide a shutter control apparatus by which the shutter can be controlled to open and close following accurately a predetermined shutter opening characteristic.

It is still another object of the present invention to provide a shutter control apparatus by which the shutter can be controlled to open and close following different shutter opening characteristics depending on the focal length of the lens.

It is a further object of the present invention to provide a shutter control apparatus by which an exposure can be effected according to shutter opening conditions.

It is a still further object of the present invention to provide a shutter control apparatus by which shutter blades can be operated stably regardless of camera position.

SUMMARY OF THE INVENTION

For achieving the above and other objects of the present invention, the shutter control apparatus comprises means for detecting the actual amount of a camera shutter which comprises a light emitting element for providing light, a variable diaphragm adapted to allow a maximum amount of light from the light emitting element to pass therethrough when the camera shutter is fully closed and to decrease the amount of light passing therethrough with opening of the camera shutter, and a photoelectric element for receiving the light passed through the diaphragm; means for controlling the light passed through the diaphragm; means for controlling the light emitting element based on a photoelectric output from the photoelectric element when the camera shutter is closed to emit a constant amount of light; and means for operating the camera shutter based on the photoelectric output and a signal representative of the predetermined shutter opening characteristic.

According to a feature of the present invention, the light emitting element can be controlled to emit a constant amount of light, and so the detection of the actaul amount of opening of the camera shutter can be performed quite accurately.

According to another feature of the present invention, the actual detected amount of opening of the camera shutter, as well as the film speed and scene brightness, is used for controlling an exposure and for providing a signal by which the camera shutter starts to close. Therefore, the exposure is effected quite accurately even if unstable operation of the camera shutter occurs.

According to a further feature of the present invention, the shutter control apparatus has considerable advantages in applications where a zoom lens or a varifocal lens is used. In this case the shutter opening characteristic is varied by detecting the variation of focal length of the lens. Specifically, a capacitor and a potentiometer are used to vary the shutter opening characteristic according to the variations of focal length of the lens.

DETAILED DESCRIPTION OF THE INVENTION

The shutter control apparatus according to a preferred embodiment of the present invention incorporates various elements, similar to those of still picture cameras. Because such elements are well known to those skilled in the art, this description will be directed in particular to elements forming part of, or cooperating directly with the shutter control apparatus embodying the present invention. It is to be understood that the diaphragms themselves may take any of various forms well-known to those skilled in the art and already commercially available.

Figure 1:
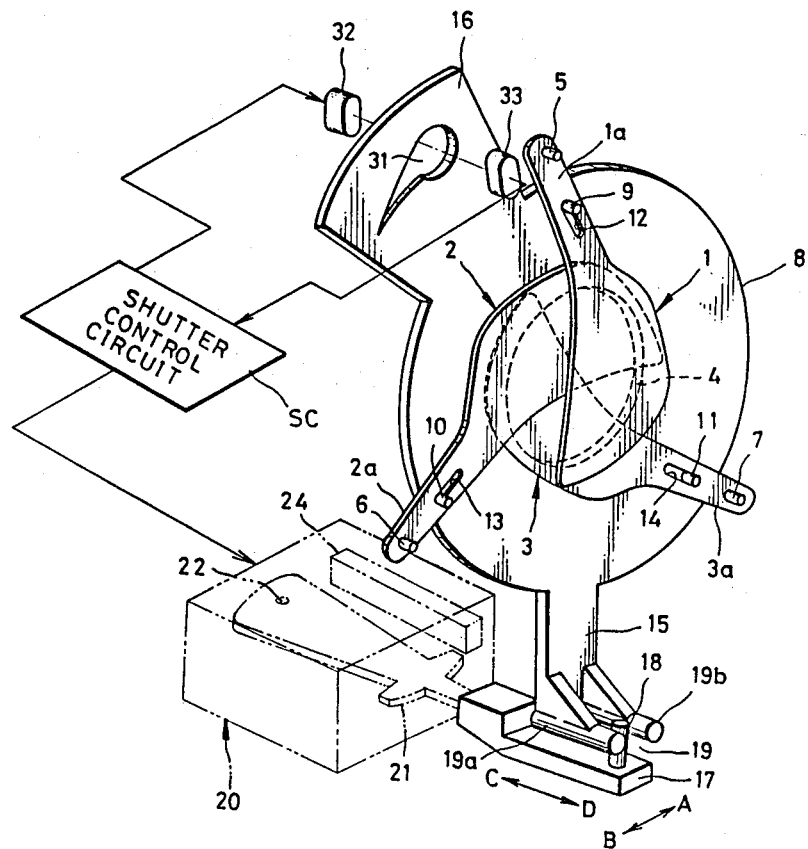
FIG. 1 is a schematic perspective view illustrating a shutter mechanism embodying the present invention.

Referring now to FIG. 1, shown therein is a shutter control apparatus of a preferred embodiment according to the present invention. The shutter control apparatus comprises a plurality of, for example three in this embodiment, shutter blades 1, 2, and 3 which cooperate with each other to open and close a lens aperture 4 formed in a base plate not shown. These shutter blades 1 to 3 are pivoted on the base plate by means of respective pins 5 to 7 each of which is mounted on a substantially radially extending arm 1a, 2a, 3a. Between the base plate and the shutter blades 1 to 3 is a shutter actuating plate 8 in the form of a thin disk-like plate having a center opening which fits an annular flange formed around the above mentioned lens opening 4 and thereby is supported for rotational movement. On each arm 1a, 2a, 3a is a cam slot 12, 13, 14, engaged by a pin 9, 10, 11 mounted on the shutter actuating plate 8. Through this pin-slot engagement, the shutter blades 1 to 3 are pivoted about the pin 5 to 7 as a result of the rotational movement of the shutter actuating plate to open and close the lens opening 4. The shutter actuating plate 8 is formed integrally with a driving arm 15 and a shutter opening amount detecting means such as a diaphragm plate 16 both of which are substantially radially extending. The driving arm 15 has an L-shaped configuration and is formed with an axial slot 19 at the distal end portion which in turn is engaged by a pin 18 extending from an actuating member 17 of a linear solenoid 20. As will be described in detail later, the solenoid 20 has an armature 21 pivoted at 22 for moving the actuating member 17 in the direction shown by an arrow A-B In this embodiment, the shutter blades 1 to 3 are pivotally moved to close the lens opening 4 when the actuating member 17 moves in the direction A and to open when the actuating member 17 moves in the direction B.

Figure 2:
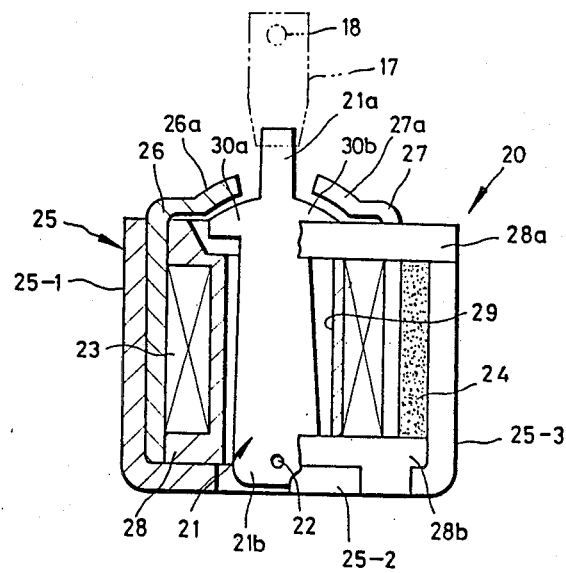
FIG. 2 is a sectional view of a linear solenoid for actuating the shutter mechanism of FIG. 1.

Reference is now had to FIG. 2 showing the linear solenoid 20 in cross section. The armature 21, as well as magnetic windings 23 and a permanent magnet 24, is supported in external and internal frames 25, and 26 and 27. These frames 25 to 27 are desirably formed of material having a high magnetic permeability such as soft iron or the like. The external frame 25 is of U-shaped configuration having three substantially rectangular walls 25-1, 25-2, and 25-3. Inside the wall 25-1 is disposed one frame 26 of the internal frame 26 and 27 and inside the wall 25-3 opposite to the wall 25-1 is disposed the other frame 27 through the permanent magnet 24. The internal frames 26 and 27 are substantially rectangular and have top portions 26a and 27a projecting out of the external wall 25, the top portions 26a and 27a being not only formed with a circular arcuate cross section but also spaced apart from and opposite to each other at these front edges. The permanent magnet 24 disposed between wall 25-3 of the external frame and internal frame 27 is a rectangular plate-like magnetic member with the N pole on the side opposite to the internal frame 27. Between the internal frames 26 and 27 is the magnetic winding 23 coiled around a cylindrical plastic core 28 having an open ended bore 29 receiving therein the armature 21, and flanges 28a and 28b at the top and bottom ends. Through the flanges 28a and 28b, the core 28 is attached to the external frame 25.

The armature 21, which is made of material having a high magnetic permeability and formed in an elongate shape, is disposed in the bore 29 of the core 28 and pivoted on a pin 22 at one end 21b. To the other or distal end 21a of the armature 21 which projects out of the top portions 26a and 26b of the internal frames 26 and 27, is secured the actuating member 17. The armature 21 near the top thereof is provided with retainers 30a and 30b extending laterally and opposite to the inner under surfaces of the top portions 26a and 27a of the internal frames 26 and 27. Each retainer 30a, 30b has an upper surface curved to maintain a predetermined distance from the under surface of the top portion 26a, 27a of the internal frames 26, 27.

When the magnetic winding 23 is deenergized, since magnetic flux is produced between the permanent magnet 24 and the armature 21 through the internal frame 27 and the external frame 25, the armature 21 is attracted by the permanent magnet 24, and is thus held inclined on the right hand side, which is opposite to the way it is shown in FIG. 2. Accordingly, the actuating member 17, as shown in FIG. 1, is shifted to the side shown by the arrow A to pivot the shutter blades 1 to 3 in the clockwise direction to close the lens opening 4. On the other hand, when the magnetic winding 23 is energized in the direction in which the magnetic flux of the permanent magnet 24 is cancelled, there are produced first and second magnetic fluxes; the first one flows through the wall 25-1 of the external frame 25, the wall 25-2 of the external frame, the armature 21, the top portion 26a of the internal frame 26, the wall 25-1 of the external frame 25, and the internal frame 26 in this order; and the other one flows through the wall 25-3 of the external frame 25, the internal frame 27, the wall 25-2 of the external frame 25, the armature 21, the top portion 27a of the internal frame 27, the wall 25-3 of the external frame 25, and the internal frame 27 in this order. The second magnetic flux acts on the permanent magnet 24 to cancel its magnetic flux, thereby allowing the armature 21 to be attachd by the first magnetic flux and swung toward the top portion 26a of the internal frame 26, which is the position shown in FIG. 2.

The linear solenoid 20 described above produces a substantially constant torque corresponding to an energizing current independently from a moved position of the armature 21. Specifically, when a certain value of energizing current is applied to the magnetic winding 23, the torque acting on the armature 21 is approximately the same wherever the armature 21 is located between the top portions 26a and 27a of the internal frames 26 and 27. With the change of energizing current, the torque changes, resulting in a change in the speed at which the armature 21 moves.

Referring again to FIG. 1, the diaphragm plate 16 of the shutter actuating plate 18 is formed therein with a variable aperture 31 defined by a common-shaped opening which changes the amount of light passing therethrough, the light to pass the diaphragm being that which is emitted from a a light emitting element 32 disposed on one side of the diaphragm plate 16 and received by a light receiving element 33 disposed on the other side thereof. The variable aperture 31 is so shaped as to have the largest aperture size when the shutter blades 1, 2, and 3 are fully closed and the smallest aperture size when fully opened. Between the largest and smallest sizes, the variable aperture 31 varies its aperture size gradually according to a predetermined diagram. In consequence, the amount of light received by the light receiving element 33 is the greatest when the shutter blades 1, 2, and 3 are fully closed and the least when fully opened. For the light emitting element, a light emitting diode, photo-diode, or the like may be desirably used.

Figure 3:
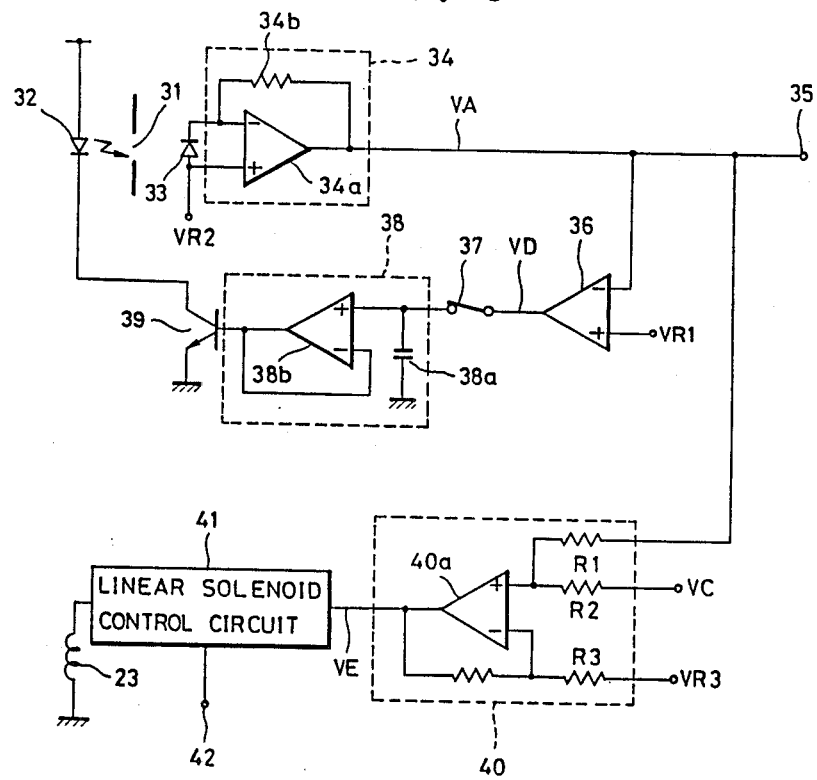
FIG. 3 is a diagram showing a shutter control circuit.

Shown in a block in FIG. 1 is a shutter control circuit SC which is described in detail with reference to FIG. 3. The shutter control circuit SC controls the light emitting element 32 to emit a predetermined constant amount of light based on a photovoltaic output from the light receiving element 33 at a time when the shutter blades 1, 2, and 3 are fully closed and controls the linear solenoid 20 in such a way that the shutter blades 1, 2, and 3 open following a predetermined shutter opening characteristic based on the comparison between the photovoltaic output from the light receiving element 33 and a standard signal representative of the predetermined shutter opening characteristic. Specifically, as is shown in FIG. 3, a light detecting circuit 34 comprises an amplifier 34a and a resistance 34b and outputs a photovoltaic output from the light receiving element 33 as a voltage signal VA. Applied to an input terminal (+) of the amplifier 34a is a pull-up standard voltage VR2. Assuming that the resistance value of the resistance 34b is R and photocurrent from the light receiving element 33 is I, the voltage signal VA is represented by the following equation:

$$VA = VR2 + I \times R.$$

A control amplifier 36 to which the voltage signal VA and a standard voltage VR1 are supplied outputs a control voltage VD by which current for driving the light emitting element 32 is controlled in such a way as to balance the voltage signal VA and the standard VR1. Between a hold circuit 38 and the control amplifier 36 is a switch 37 which is opened in cooperation with a shutter release operation to cut the control voltage VD and closed at the completion of exposure. The hold circuit 38 comprises a capacitor 38a and an amplifier 38b and functions to hold the control voltage VD from the control amplifier 36. The amplifier 38b serves as a voltage follower which functions to permit the control voltage VD charged in the capacitor 38a to be supplied to the base of a control transistor 39 when the switch 37 is opened. The control transistor 39 has its collector connected to a power line through the light emitting element 32 and its emitter grounded.

Figure 4:
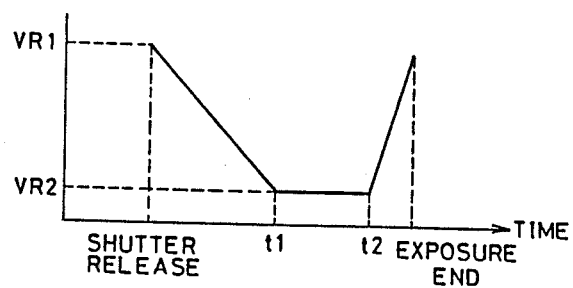
FIG. 4 is an explanatory diagram showing a signal representative of shutter opening characteristics.

Shown at 40 in FIG. 3 is an operational circuit including an operational amplifier 40a with its input terminal (+) receiving voltage signal VA in the form of voltage through a resistance R1 and a voltage VC through a resistance R2 and with its input terminal (−) receiving a standard voltage VR3 representative of the predetermined shutter opening characteristic through a resistance R3. The above-mentioned voltage VC is a bias voltage applied to cancel the magnetic flux of the permanent magnet 24 of the linear solenoid 20 so as not to apply any force to the armature 21. The standard voltage VR3 has a characteristic shown in FIG. 4.

Simultaneously with a release operation of the shutter, the standard voltage VR3 is applied to the operational amplifier 40a and linearly decreases to the standard voltage VR2 by a time t1. Correspondingly to the decrease of the standard voltage VR3, the shutter blades gradually open and finally fully open at the time t1. The operational circuit 40 whose output is represented by (VA+VC−VR3) if the resistance R1 to R3 are equal to each other in value, provides an output VE by which the values VA and VB are balanced. A solenoid control circuit 42 receives the output VE to energize the magnetic winding 23 according to the output VE and, on the other hand, receives a shutter closed signal from an exposure control circuit shown in and described later with reference to FIG. 5 at an input terminal 42 to deenergize, or to reversely energize, the magnetic winding 23 until the shutter blades 1, 2, and 3 are fully closed.

Figure 5:
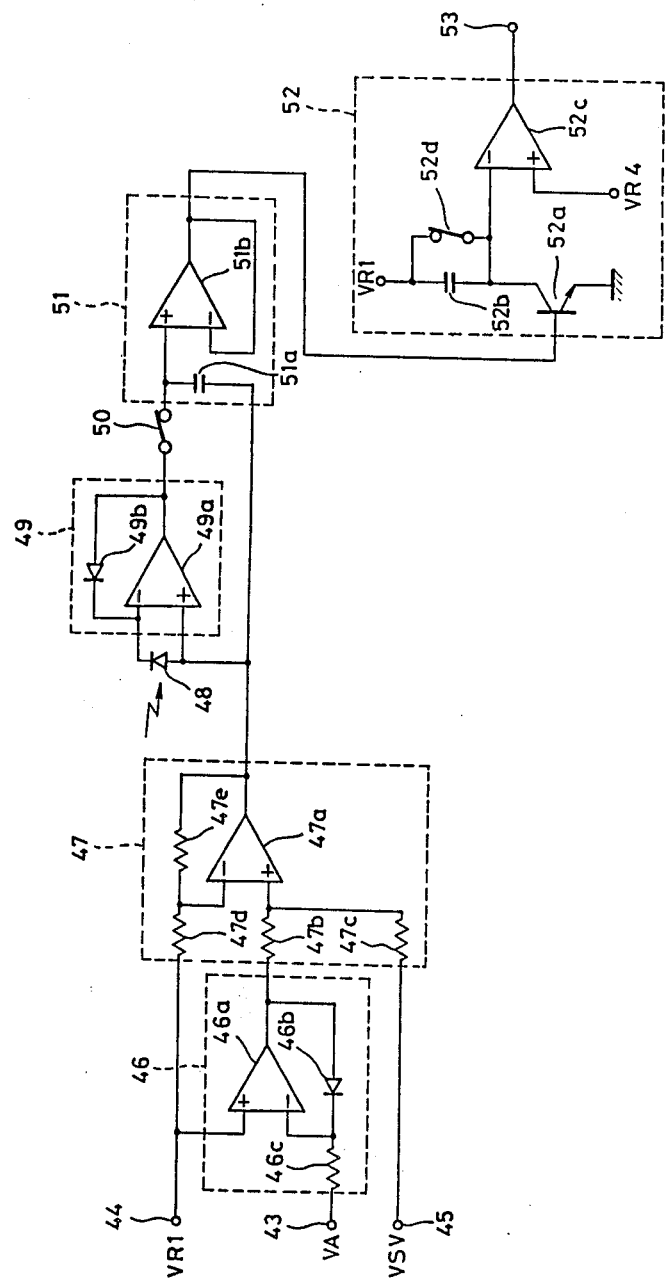
FIG. 5 is a diagram showing an exposure control circuit.

Reference is now had to FIG. 5 showing the exposure control circuit wherein an input terminal 43 receives the signal voltage VA from the output terminal 35 of the shutter control circuit shown in FIG. 3. To input terminals 44 and 45, the standard voltage VR1 and a film speed signal VSV in a logarithmically compressed form are applied, respectively. The film speed is automatically provided by detecting a film speed code on a patrone loaded in the camera and effecting a D/A conversion which is performed in any well-known manner.

A logarithmic compression circuit 46 is provided to compress logarithmically the signal voltage VA and is comprised by an operational amplifier 46a, a diode 46b, and a resistance 46c. The operational amplifier 46a is connected to the terminal 44 at its input terminal (+) for the standard voltage VR1 and the input terminal 43 through the resistance 46c at its input terminal (−) for the signal voltage VA. The diode 46b is connected between the output terminal and input terminal (−) of the operational amplifier 46a in such a way to make the direction of easy flow from the output terminal to the input terminal (−). In the logarithmic compression circuit 46 thus constructed, the standard voltage VR1 and a logarithmically compressed signal VAV of the signal voltage VA are added together and so an output (VR1+VAV) is provided. The logarithmically compressed signal voltage VAV increases as the shutter blades 1, 2, and 3 gradually open.

After the logarithmic compression circuit 46, there is an operational circuit 47 comprised by an operational amplifier 47a. The operational amplifier 47a at its input terminal (+) is connected to the output terminal of the logarithmic compression circuit 46 through a resistance 47b and to the terminal 45 through a resistance 47c for the film speed signal VSV. On the other hand, the operational amplifier 47a at its input terminal (−) is connected to the terminal 44 through a resistance 47d for the standard voltage VR1 and to the output terminal thereof through a resistance 47e. All the resistance 47c through 47e have the same resistance value. In this operational circuit 47, the logarithmically compressed signal VA|V and the film speed signal VSV are added together and so an outpuut (VAV+VSV) is provided.

A light receiving element 48 is provided to detect scene light and is, in this embodiment, a photo-diode disposed on any outer surface of the camera in a well-known manner.

After the operational circuit 47, there is another logarithmic transforming circuit 49 comprised by an operational amplifier 49a and a diode 49b, which is provided to logarithmically compress a photoelectric output from the photo-diode 48. The operational amplifier 49a is connected to the output terminal of the operational circuit 47 and to the anode of the photo-diode 48 at its input terminal (+), and to the cathode of the photo-diode 48 at its input terminal (−). The diode 49b is connected between the output terminal and input terminal (−) of the operational amplifier 49 in such a way to make the direction of easy flow from the output terminal to the input terminal (−). In the logarithmic compression circuit 49, the output (VAV+VSV) from the operational circuit 47 and a logarithmically compressed signal VBV of the photoelectric output VB from the photodiode 48 are added together thereby to provide an output (VAV−VSV+VBV). The output from the logarithmic compression circuit 49 is shut off by a switch 50 which is opened in cooperation with a release operation of the shutter and closed at the completion of exposure.

A hold circuit 51 comprised by a capacitor 51a and an operational amplifier 51b is connected to the logarithmic compression circuit 49 through the switch 50 an to operational circuit 47 to hold the ouptut (VAV+VSV+VBV) and the output (VAV+VSV). The condenser 51a is connected, at its one electrode, to the output of the logarithmic compression circuit 49 through the switch 50 as well as to the input terminal (+) of the operational amplifier 51b and, at its other electrode, to the output terminal of the operational circuit 47. The input terminal (−) and the output terminal of the operational amplifier 51b are interconnected to each other so as to form a voltage follower. As will be apparent from the above description, the capacitor 51a can hold the photoelectric output VBV immediately before the switch 50 opens. Therefore, the hold circuit 51 can provide an output which is the sum of the film speed VSV and the signal voltage VAV and which varies according to the amount of opening of the shutter blades 1, 2, and 3.

Connected to the output terminal of the hold circuit 51 is a signal generating circuit 52 which is comprised by a transistor 52a, an integrating capacitor 52b, a comparator 52c, and a switch 52d and can generate a shutter closing signal. The transistor 52a is connected to the output of the hold circuit 51 at its base and is grounded at its emitter. To the transistor 52a at its collector, the standard voltage VR1 is applied through the integrating capacitor 52b. The comparator 52c is connected to the junction of the collector of the transistor 52a and the integrating capacitor 52b at its input terminal (−) and is supplied with a standard voltage VR4 at its input terminal (+). The switch 52d is connected in parallel with the integrating capacitor 52b and is opened in cooperation with the release operation of the shutter and is closed at the completion of exposure. The transistor 52a serves as an expansion circuit to provide a collector current in proportion to an expanded voltage of the output from the hold circuit 51. The integrating capacitor 52b is shorted out while the switch 52d is maintained closed and is charged by the collector current when the switch is opened to provide the comparator 52c at its output terminal (−) with an integrated output.

Figure 6:
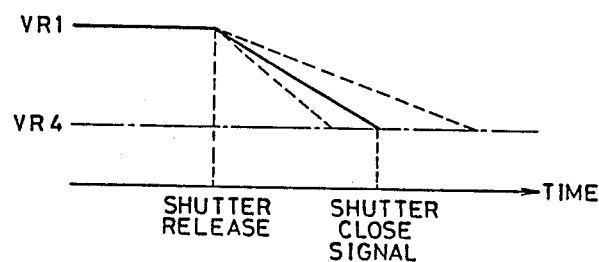
FIG. 6 is a diagram of a voltage applied to a comparator of FIG. 5.

As is shown in FIG. 6, the voltage appearing at the input terminal (−) of the comparator 52c becomes equal to the standard voltage VR1 before the release operation of the shutter, namely while the switch 52d is closed, and gradually decreases to the standard voltage VR4 after the switch 52d is opened in cooperation with the release operation of the shutter. The more the photo-diode 48 detects scene light, the more declines a gradient of the voltage at the input terminal of the comparator 52c. In contrast with this, the less the photodiode 48 detects scene light, the more gently falls the gradient. The conditions are shown respectively by the dotted inclined lines to the left and right of the solid inclined line in FIG. 6. When the integrated output becomes equal to the standard voltage VR4 which defines a threshold level for determining the most suitable exposure, the comparator 52 provides a high level of output as a shutter closing signal at its output terminal 53 which in turn is connected to the input terminal 42 of the solenoid control circuit 41 shown in FIG. 3.

In the operation of the shutter control apparatus of the present invention, when no power is applied to either the shutter control circuit or the exposure control circuit shown in FIGS. 3 and 5, respectively, the shutter blades 1, 2, and 3 are all maintained fully open because the permanent magnet 24 does not attact the armature 21 of the linear solenoid 20, placing the variable opening 31 of the diaphragm plate 16 in a position wherein the variable opening 31 passes the maximum amount of light from the light emitting element 32 to the light receiving element 33. When power is applied to the circuits prior to shutter release, the light emitting element 32 is driven by the control voltage VD from the control amplifier 36 to emit a predetermined amount of light, the control voltage VD controlling the driving current for the light emitting element 32 in such a way to make the voltage signal VA equal to the standard voltage VR1.

Moreover, the exposure control circuit show in FIG. 5, upon the application of power thereto, provides the base of the transistor 52a with the added sum of the voltage signal VAV, the film speed signal VSB, and the photoelectric output VBV through the logarithmic compression circuit 46, the operational circuit 47, the logarithmic compression circuit 49, and the hold circuit 51. However, because the switch 52d is closed, the comparator 52c holds its output at a low level.

If in fact the release operation of shutter is performed, the switch 37 of the shutter control circuit shown in FIG. 3 is simultaneously opened and thereby the hold circuit 38 holds the control voltage VD. As the transistor 39 causes driving current for the light emitting element 32 to be constant based on the held control voltage VD, the light emitting element 32 is controlled to emit a predetermined amount of light. Simultaneously with this, the operational circuit 40 receives the standard voltage VR3 representative of the shutter opening characteristic and then provides the linear solenoid control circuit 41 with an output VE by which the voltage signal VA from the light receiving circuit 34 is made equal to the standard voltage VR3. In consequence, the magnetic winding 23 of the linear solenoid 20 is energized to attract the armature 21 toward the permanent magnet 24, thereby rotating the shutter actuating plate 8 in the clockwise direction shown by the arrow B in FIG. 1 so as to open the shutter blades 1 to 3.

The amount of opening of the shutter blades 1 to 3 is detected based on the amount of light which passes through the aperture 31 of the diaphragm plate 16 and is received by the light receiving element 33. Therefore, the amount of opening of the shutter blades 1 to 3 is reflected in the voltage signal VA output from the light receiving circuit 34. The operating circuit 40 and the linear solenoid control circuit 41 control the energization or deenergization of the magnetic wiring 23 in such a way that the signal voltage VA always becomes equal to the reference signal VR3. Moreover, in the exposure control circuit of FIG. 5, the switches 50 and 52d open simultaneously with the release operation of shutter. As a result, the hold circuit 51 holds the photoelectric output VBV generated immediately before the release operation of shutter. Through the hold circuit 51, a voltage which is the added sum of the held photoelectric output VBV, the signal voltage VAV depending on the amount of opening of the shutter blades 1 to 3, and the film speed signal VSV, is sent to the base of the transistor 52a. Consequently, a current in proportion to a voltage obtained as a result of the expansion of the summed voltage will appear at the collector of the transistor 52a and causes the integrating capacitor 52b to be charged, providing an integrated output at the input terminal (−) of the comparator 52c.

At the moment this integrated output reaches the standard voltage VR4, the output from the comparator 52c turns from L level to H level, providing a shutter closing signal to the input terminal 42 of the linear solenoid control circuit 41. The linear solenoid control circuit 41, immediatey after receiving the shutter closing signal, deenergizes the magnetic winding 23, and the shutter blades 1 to 3 immediately start to close. When the shutter blades fully close to complete an exposure, the switches 50 and 52d are closed to cause the comparator 52c to output a signal of L level. In the case of reversely energizing the magnetic winding 23, the reverse energization of the winding 23 is released when the comparator 52c outputs a signal of L level.

It will be understood by those skilled in the art that the hold circuit 51 and the switch 50 can be omitted by directly connecting the output terminal of the logarithmic compression circuit 49 to the base of the transistor 52a. This direct connection is advantageous in that exposure control can follow the change of scene brightness during exposure.

Figure 10:
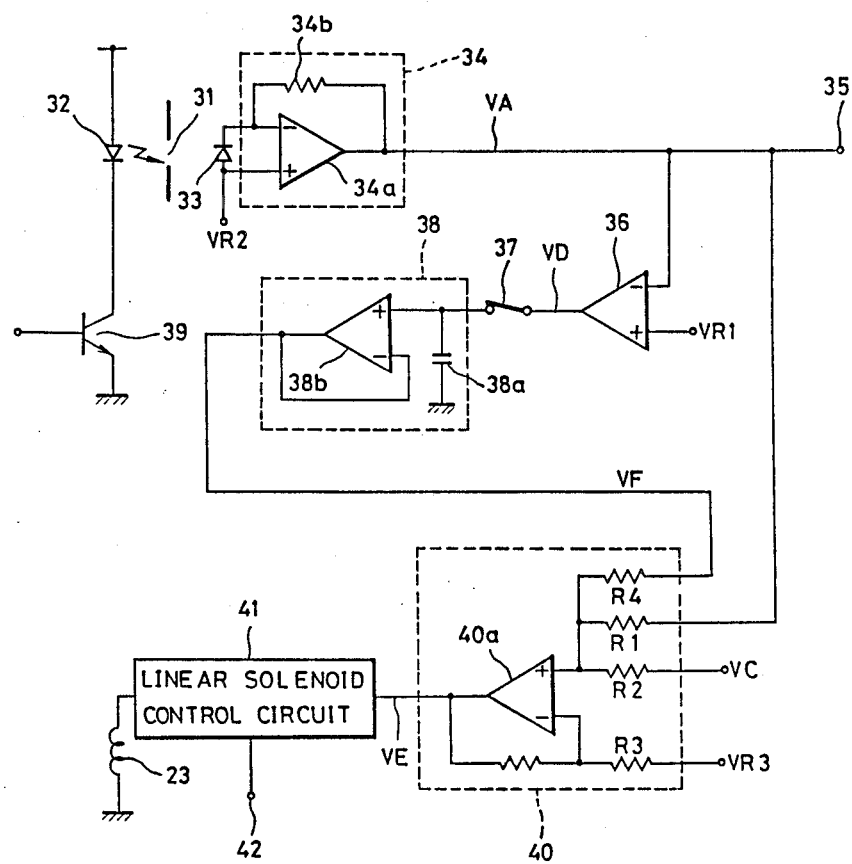
FIG. 10 is a diagram showing a shutter control circuit of another embodiment of the present invention.

FIG. 10 shows an alternative embodiment of the shutter control circuit of FIG. 3. In this shutter control circuit, the output VF from the hold circuit 38 is added to the voltage signal VA at the input terminal (+) of the operational circuit 40. Therefore, the output VE is represented by (VF+VA+VC−VR3). As the output VF is the difference between the standard voltage VR1 and the voltage signal VA and the standard voltage is constant, the added sum of the outputs VA and VF becomes constant. In consequence, when the shutter is fully closed, the output VE from the operational amplifier 40 is constant, making it possible to cause the shutter to open and close following the predetermined shutter opening-closing characteristic.

Figure 7:
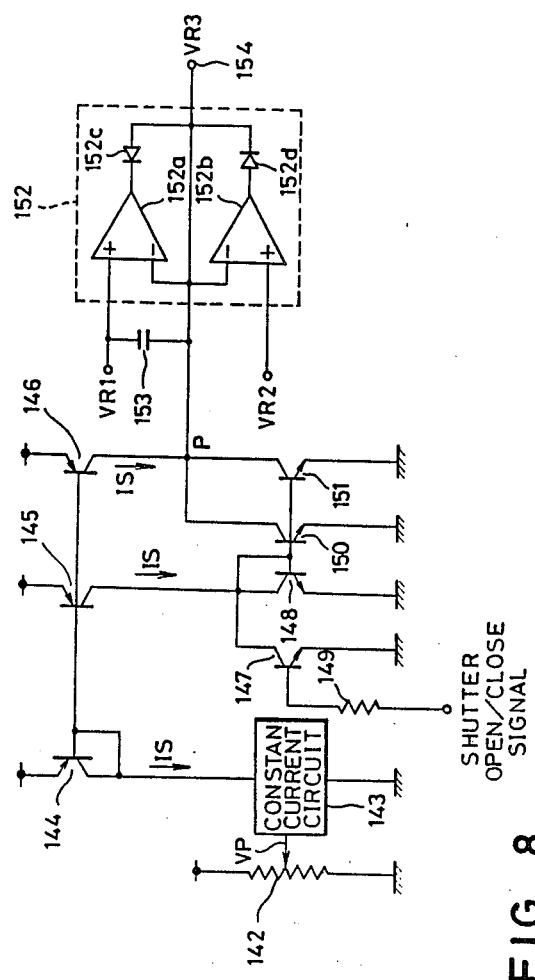
FIG. 7 is a diagram showing a circuit for changing shutter opening characteristics according to focal length.

The shutter control apparatus of this invention is advantageously applicable to a camera which is equipped with a varifocal lens or a zoom lens. For this application, a reference signal control circuit shown in FIG. 7 for providing a reference signal VR3 according to changed focal lengths of the lens is used in cooperation with the shutter control circuit shown in FIG. 2. In FIG. 7, there is a potentiometer 142 for producing a voltage signal VP representative of the focal length to which the lens is adjusted. The adjusted focal length may be detected depending on the extended position of lens barrel. For this detection, the shutter actuating plate 8 with its associated shutter cam elements is adapted to move in a direction shown by an arrow C-D in FIG. 1 according to the changing of focal length of the lens. A constant-current circuit 143 which provides a constant current IS corresponding to the voltage signal VP is connected between a power line and ground through the collector-emitter circuit of a transistor 144.

In this FIG. 7 embodiment, the value of constant current IS becomes larger as the focal length becomes longer. The transistor 144 is connected between its base and collector and connected to other transistors 145 and 146 at their bases. The transistors 145 and 146, whose emitters are connected to the power line, make up a current-mirror in cooperation with the transistor 144. In consequence, when the transistor 144 receives the constant current IS corresponding to the voltage signal VP through its collector, the same value of current as the constant current IS flows through the collector of each transistor 145, 146.

The transistor 145 is also connected to a control transistors 147 between their collectors and also to a transistor 148 between their collectors. The control transistor 147 is grounded through its emitter and at its base receives a shutter open/close signal through a resistance 149. The shutter open/close signal will change to L level simultaneously with the commencement of closing of the shutter. The transistor 148 is looped between its base and collector, and grounded through its emitter, and further connected to the bases of other transistors 150 and 151 which are grounded through their emitters and of which the collectors are connected to the collector of the transistor 146 at a junction or point P. These transistors 150 and 151 also make up a current-mirror in cooperation with the transistor 148. The transistor 148, 150, and 151 are rendered nonconductive when the control transistors 147 is conductive and conductive when the control transistors 147 is nonconductive. The control transistor 147 is made nonconductive when the shutter open/close signal is at L level and conductive when the shutter open/close signal is at H level.

A limiter circuit 152 is comprised by amplifiers 152a and 152b, and diodes 152c and 152d. The amplifier 152a receives the standard voltage VR1 at its input terminal (+) and the amplifier 152b receives the standard voltage VR2 at its input terminal (+). Each amplifiers 152a, 152b is connected between the point P and a terminal 154 for outputting the reference signal VR3, at its input terminal (−). The amplifier 152a at its output terminal is connected to the output terminal 154 thrugh the diode 152c disposed therebetween in backward direction, and the amplifier 152b at its output terminal is connected to the output terminal 154 through the diode 152d disposed therebetween in forward direction. Voltage supplied to the output terminal 154 by the limiter circuit 152 thus structured is restricted between the standard voltage VR1 as an upper limit and the reference voltage VR2 as a lower limit. A capacitor 153 is provided between the input terminal (+) of the amplifier 152a and the point P. The output terminal 154 for outputting the reference signal VR3 is connected to the corresponding terminal shown in FIG. 3.

Figure 8:
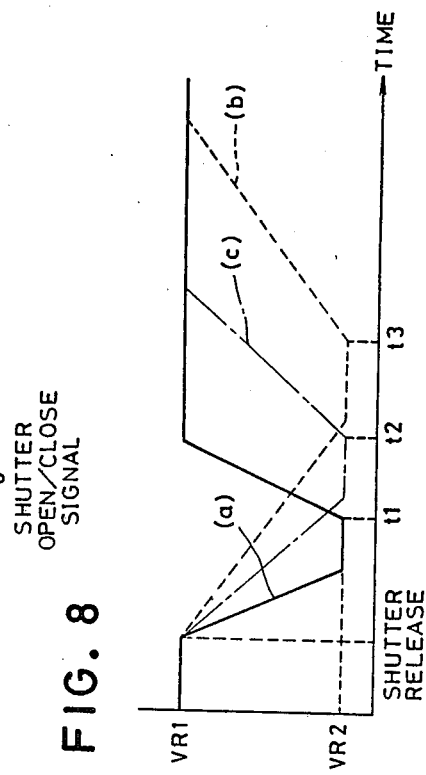
FIG. 8 is an explanatory diagram showing signals similar to FIG. 4.

A reference signal VR3 is illustrated in FIG. 8. A solid line (a) indicates the reference signal VR3 when the lens is adjusted to a long focal length; a dashed line (b) when the lens is adjusted to a short focal length; and a dotted line (c) when the lens is adjusted to a middle focal length. The reference signal VR3 is equal to the standard voltage VR1 before the shutter is released and decreases, after the shutter is released, to the standard voltage VR2 with the charge of the capacitor 153, and increases again with the discharge of the capacitor 153 to the standard voltage VR1. The increase of the reference signal VR3 starts simultaneously with the commencement of closing of the shutter at a time t1, t2, or t3 after having reached the standard voltage VR2.

The gradient of increase and decrease of the reference signal VR3 depends on the discharge times of the capacitor 153: the larger the constant current is, the shorter the charge or discharge time of the capacitor 153 is. Since the constant current becomes large when the focal length of the lens becomes long, the gradient of increase or decrease of the reference signal is steeper as is shown by the solid line (a) when the focal length of lens is longer and more gentle as is shown by the dashed line (b) when the focal length is shorter, and is intermediate in inclination as is shown by the dotted line (c) when the focal length is intermediate.

It is to be noted in FIGS. 7 and 8 that the shutter open/close signal by which the control transistor 147 is turned conductive or nonconductive becomes H level at the time t1, t2, t3 after having become L level simultaneously with shutter release and that the time t1, t2, t3 at which the shutter starts to close can be detected by counting time elapsed after the shutter release for example.

In the operation of the shutter control apparatus of this embodiment according to the present invention, when no power is supplied to either the shutter control circuit shown in FIG. 2 or the reference signal control circuit shown FIG. 7, the shutter blades 1 to 3 are all maintained fully closed because the magnetic winding 24 of the linear solenoid 21 is not energized and so the permanent magnet 24 attracts the armature 22, placing the variable aperture 31 of the diaphragm plate 16 in the position wherein the variable aperture 31 passes the maximum amount of light from the light emitting element 32 to the light receiving element 33. If a power is supplied to the circuits prior to shutter release, the light emitting element 32 is driven by the control voltage VD from the control amplifier 36 to emit a predetermined amount of light, the control voltage VD controlling the driving current for the light emitting element 32 in such a way to make the voltage signal VA equal to the standard voltage VR1.

Moreover, the reference signal control circuit shown in FIG. 7, under the application of power thereto, provides a voltage signal VP according to a focal length to which the lens has been adjusted. A constant current IS corresponding to the voltage signal VP is allowed to flow through the collectors of the transistors 144 to 146. Since shutter release has not yet been effected, the shutter open/close signal is at H level and the transistor 147 is rendered conductive, but the transistors 148, 150, and 151 are rendered nonconductive. Therefore, the voltage appearing at the point P is equal to the standard voltage VR1 and the reference signal VR3 at the output terminal 154 is the standard voltage VR1. This being so, since the voltage signal VA becomes equal to the reference signal VR3, the output VD from the operational circuit 40 in FIG. 2 coincides with the bias voltage VC. As the linear solenoid control circuit 41 is rendered inoperative by means of a control signal, the magnetic winding 23 of the linear solenoid 21 is never energized based on the bias voltage VC and thereby the permanent magnet 24 continues to attract the armature 22 so as to maintain the shutter blades 1 to 3 fully closed.

Upon releasing the shutter, the switch 37 is simultaneously opened to hold the control voltage VD in the holding circuit 38. As the transistor 39 keeps the driving current for the light emitting element 32 constant based on the held control voltage VD, the light emitting element 32 emits a constant amount of light. Simultaneously, on the other hand, the shutter open/close signal turns L level by the shutter release operation, turning the control transistors 147 conductive and the transistors 148, 150, and 151 nonconductive. Due to the current mirror comprised by the transistors 148, 150 and 151, the capacitor 143 is charged by the constant current IS. If the lens has been adjusted to a long focal length, the reference signal VR3 decreases along the line (a) shown in FIG. 8 from the standard voltage VR1 to VR2.

The operational circuit 40 provides the linear solenoid control circuit 41 with the output VE by which the voltage signal VA is made equal to the reference signal VR3. As the linear solenoid control circuit 41 is caused to act upon the shutter release operation, the winding 23 of the linear solenoid 21 is energized to force the armature 22 to move toward the side opposite to the permanent magnet 25, thereby rotating the shutter actuating plate 8 in the clockwise direction to open the shutter blades 1 to 3. The size of the opened aperture of the shutter blades 1 to 3 is reflected in the voltage signal VA which follows the decrease of the amount of light received by the light receiving element 33 and the linear solenoid control circuit 41 controls energization of the magnetic winding 23 in such a way to make the voltage signal VA equal to the reference signal VR3. In consequence, the shutter blades 1 to 3 open at a rate following the gradient of decrease of the reference signal VR3.

When the shutter open/close signal turns H level at the time t1, the control transistor 147 turns conductive and the transistors 148, 150, and 151 turn nonconductive, the voltage appearing at the point P increases from the standard voltage VR2 to VR1 according to the discharge of the capacitor 153. In the same manner as previously described, the armature 21 swings toward the permanent magnet 24 according to the output VE to rotate the shutter actuating plate 8 in the counterclockwise direction so as to close the shutter blades 1 to 3 at a rate following the gradient of increase of the reference signal VR3.

If the lens is adjusted to a medium or short focal length, the constant current IS is correspondingly decreased by the potentiometer 1422 and the constant-current circuit 143, whereby the charge and discharge time of the capacitor 153 is prolonged. As a result, the reference signal VR3 follows the line (b) or (c) in FIG. 8.

Figure 9A:
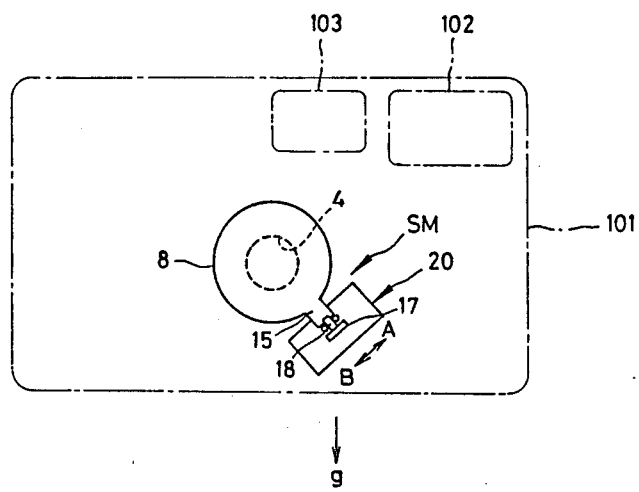
FIGS. 9A and 9B are schematic views of cameras in which the shutter control apparatus is incorporated.
Figure 9B:
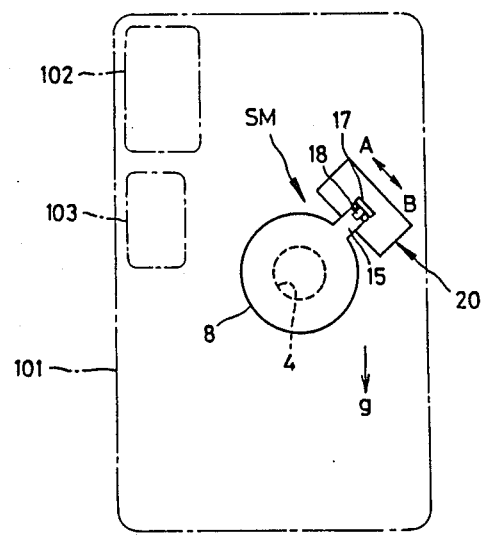

FIGS. 9A and 9B show a camera in which the shutter control apparatus of the invention is incorporated. The camera 101 is provided with a strobe flash 102 and a finder 103 both of which are well known in the art. The shutter apparatus SM comprised according to the present invention is built in the camera and so disposed that the actuating member 17 can move in a direction at approximately 45° with respect to the direction of gravity when the camera 101 is held either in a horizontal position or in an upright position. Due to the inclination of the shutter arrangement, the actuating member 17 can always be acted on by gravity at 45° with respect to the direction of movement of the actuating member 17. Therefore, the shutter actuating plate 8, and hence the shutter blades 1 to 3 can operate in the same way independently from the camera attitudes or camera positions, namely, the horizontal position and the upright position.

Although the present invention has been fully described by way of the preferred embodiments thereof with reference to the accompanying drawings, it is to be understood that various changes and modifications will be apparent to those skilled in the art. Therefore, unless otherwise such changes and modifications depart from the scope of the present invention, they should be construed as included therein.

What is claimed is:

1. A shutter control apparatus for controlling a camera shutter to open and close according to a predetermined shutter opening-closing characteristic, said apparatus comprising:
    means for detecting the amount of opening of a said camera shutter, said detecting means comprising an element for emitting light, a variable diaphragm for passing a maximum amount of light therethrough when said camera shutter is fully closed and progressively less light therethrough as said camera shutter opens, an element for receiving said light from said light emitting element through said variable diaphragm;
    means for comparing an output from said detecting means with a predetermined reference value to provide a difference signal;
    means responsive to said difference signal for correcting said output; and
    means for actuating said camera shutter in such a way as to make said corrected output coincide with a value representative of said predetermined shutter opening-closing characteristic thereby to cause said camera shutter to open and close following said predetermined shutter opening-closing characteristic.

2. A shutter control apparatus as defined in claim 1, wherein said correcting means includes means to add said output and said difference.

3. A shutter control apparatus as defined in claim 1, wherein said correcting means includes means to control said light emitting element to emit a constant amount of light when said camera shutter is fully opened.

4. A shutter control apparatus for controlling a camera shutter to open and close according to a predetermined shutter opening characteristic, said apparatus comprising;
    means for detecting the amount of opening of a said camera shutter, said detecting means comprising an element for emitting light, a variable diaphragm which allows a maximum amount of light from said light emitting element to pass therethrough when said camera shutter is fully closed and progressively decreases the amount of said light passing therethrough as said camera shutter opens, and a photoelectric element receiving said light passed through said diaphragm;
    means for controlling said light emitting element according to the photoelectric output from said photoelectric light receiving element to emit a constant amount of light when said camera shutter is fully closed; and
    means for actuating said shutter in such a way as to make said photoelectric output from said photoelectric light receiving element equivalent to a value representative of said predetermined shutter opening characteristic, thereby controlling said camera shutter to open and close following said predetermined shutter opening characteristic.

5. A shutter control apparatus as defined in claim 4, wherein said variable diaphragm is an aperture defined by a comma-shaped opening formed in a shutter actuating plate.

6. A shutter control apparatus as defined in claim 4, wherein said variable diaphragm is an optical wedge attached to a shutter actuating plate.

7. A shutter control apparatus as defined in claim 4, wherein said actuating means includes a linear solenoid for causing a rotational movement of a shutter actuating plate.

8. A shutter controlling apparatus as defined in claim 7, wherein said linear solenoid comprises a pivoted armature, a permanent magnet, and a magnetic winding, said pivoted armature being operatively coupled to said shutter actuating plate so as to control said shutter to open and close.

9. A shutter control apparatus for use with a camera which has a taking lens with a variable focal length for controlling a camera shutter to open and close according to a predetermined shutter opening-closing characteristic, said apparatus comprising:
    means for detecting the amount of opening of a said camera shutter, said detecting means comprising an element for emitting light, a variable diaphragm which passes said light from said light emitting element therethrough according to said amount of opening of said camera shutter, and photoelectric element for receiving said light passed through said variable diaphragm;
    means for emitting a reference signal representative of said predetermined shutter opening-closing characteristic;
    means for program-controlling said camera shutter in such a way as to make a photoelectric output from said photoelectric light receiving element coincide with said reference signal so as to open and close said shutter following and predetermined shutter opening-closing characteristic; and
    means for changing said reference signal according to variations of said variable focal length of said taking lens.

10. A shutter control apparatus for use with a camera which has a taking lens with a variable focal length for controlling a shutter to open and close according to a predetermined shutter opening characteristic, said apparatus comprising:
    means for detecting the amount of opening of a said shutter, said detecting means comprising an element for emitting a light, a variable diaphragm which allows a maximum amount of light from said light emitting element to pass therethrough when said shutter is fully closed and progressively decreases the amount of light passing therethrough as said shutter opens, and a photoelectric element for receiving said light passed through said diaphragm;

means for emitting a reference signal representative of said predetermined shutter opening-closing characteristic;

means for a prgram-controlling said shutter in such a way as to make a photoelectric output from said photoelectric light receiving element equivalent to said reference signal so as to open and close said shutter following said predetermined shutter opening characteristic; and means for changing said reference signal depending on variations of said variable focal length.

11. A shutter control apparatus as defined in claim 10, wherein said changing means includes a potentiometer for providing a current which is variable depending on said variations of said variable focal length and a capacitor whose charging and discharging time depends on said current.

12. A shutter control apparatus as defined in claim 10, further comprising means for controlling said light emitting element according to a photoelectric output from said photoelectric light receiving element to emit a constant amount of light when said shutter is fully closed.

13. A shutter control apparatus as defined in claim 10, wherein said variable diaphragm is an aperture defined by a comma-shaped opening formed in a shutter actuating plate.

14. A shutter control apparatus as defined in claim 10, wherein said variable diaphragm is an optical wedge attached to a shutter actuating plate.

15. A shutter control apparatus as defined in claim 10, wherein said program-controlling means includes a linear solenoid for causing a rotational movement of a shutter actuating plate.

16. A shutter control apparatus for use with a camera of the type having a device for measuring external light, said apparatus comprising:

means for detecting the amount of opening of a shutter of said camera to provide a signal representative the detected amount of opening if said camera shutter, said detecting means comprising an element for emitting light, a variable diaphragm which allows a maximum amount of light from said light emitting element to pass therethrough when said camera shutter is fully closed and progressively decreases the amount of said light passing therethrough as said camera shutter opens, and a photoelectric element for receiving said light passed through said diaphragm;

an external light receiving element for detecting a scene brightness; and means for determining a proper exposure based on said signal provided from said detecting means, said detected scene brightness, and the film speed of a film loaded on said camera and providing a shutter closing a signal following said exposure determination for causing said shutter to close.

17. A camera of the type controlling a shutter to open and close following a predetermined shutter opening characteristic, said camera comprising:

means for detecting the amount of opening of a said shutter to provide a shutter opening signal;

means for providing a signal representative of said shutter opening characteristic; and means for causing said shutter to open and close based on said shutter opening signal and said shutter opening characteristic signal in such a way as to make said signals equal to each other, said causing means including a linear solenoid comprising a pivoted armature, a permanent magnet, a magnetic winding, and means to energize said magnetic winding, said pivoted armature being operationally coupled to a member that actuates said shutter, said permanent magnet attracting said pivoted armature when said magnetic winding is deenergized.

18. A camera of the type controlling a shutter to open and close following a predetermined shutter opening characteristic, said camera comprising:

means for detecting the amount of opening of a said shutter to provide a shutter opening signal;

means for providing a signal representative of said shutter opening characteristic; and means for causing said shutter to open and close based on said shutter opening signal and said shutter opening characteristic signal in such a way as to make said signals equal to each other, said causing means comprising a pivoted member operationally coupled to a member that actuates said shutter, said pivotal member being mounted on the camera for pivotal movement relative to the camera in a position such as to pivot in a direction at approximately 45° with respect to the direction of action of gravity when said camera is held either in a horizontal position or in an upright position.

19. A camera as defined in claim 18, in which said pivotal member is an armature of a linear solenoid having a magnetic winding and means to energize said magnetic winding, said winding being so disposed as to pivot said armature when energized.

20. A camera as defined in claim 19, and a permanent magnet that pivots said armature when said winding is deenergized.

* * * * *